(12) United States Patent
Westlake

(10) Patent No.: US 9,609,129 B2
(45) Date of Patent: Mar. 28, 2017

(54) SYSTEM AND METHOD FOR SECURE TRANSMISSION OF DATA SIGNALS

(71) Applicant: Syntec Holdings Limited, London (GB)

(72) Inventor: Colin Philip Westlake, London (GB)

(73) Assignee: Syntec Holdings Limited, London (GB)

( * ) Notice: Subject to any disclaimer, the term of this patent is extended or adjusted under 35 U.S.C. 154(b) by 0 days.

(21) Appl. No.: 15/019,908

(22) Filed: Feb. 9, 2016

(65) Prior Publication Data

US 2017/0026516 A1    Jan. 26, 2017

Related U.S. Application Data

(60) Provisional application No. 62/196,159, filed on Jul. 23, 2015.

(30) Foreign Application Priority Data

Jul. 23, 2015   (GB) .................................. 1513048.7

(51) Int. Cl.
*H04M 11/00*         (2006.01)
*H04M 3/00*          (2006.01)
(Continued)

(52) U.S. Cl.
CPC ....... *H04M 3/5183* (2013.01); *H04M 7/1295* (2013.01); *H04M 2203/6009* (2013.01)

(58) Field of Classification Search
CPC ........... H04M 7/0078; H04M 3/42059; H04M 1/665; H04M 3/38; H04M 3/382; H04M 3/42; H04L 63/18; G06Q 20/40145
(Continued)

(56) References Cited

U.S. PATENT DOCUMENTS 6,862,343 B1 *   3/2005   Vacek .................. H04M 3/5166
                                                      379/266.1
8,275,115 B1 *   9/2012   Everingham ....... H04M 3/5166
                                                      379/265.01
(Continued)

FOREIGN PATENT DOCUMENTS

GB          2478916 B         6/2014
WO     WO 2011/117573         9/2011

*Primary Examiner* — Binh Tieu
(74) *Attorney, Agent, or Firm* — Fenwick & West LLP

(57) ABSTRACT

The present invention provides systems and methods for controlling signaling data transmitted over a communication system between a first party and a second party. The system comprises a first communication channel configured to carry communication data, wherein the communication data comprises the content of the communication between the first party and the second party; a second communication channel configured to carry signaling data, wherein the signaling data comprises data relating to the first communication channel and sensitive data transmitted by the first party; a signaling processor configured to receive the signaling data from the first party via the second communication channel, modify the signaling data to remove or replace at least some of the sensitive data in the signaling data, and transmit the modified signaling data via the second communication channel to the second party.

20 Claims, 3 Drawing Sheets

(51) Int. Cl.
*H04M 5/00* (2006.01)
*H04M 3/51* (2006.01)
*H04M 7/12* (2006.01)

(58) Field of Classification Search
USPC ......... 379/93.02, 93.03, 93.09, 93.12, 93.26,
379/265.01, 265.02, 265.09, 266.1
See application file for complete search history.

(56) References Cited

U.S. PATENT DOCUMENTS

| | | | | |
|---|---|---|---|---|
| 8,401,875 | B2* | 3/2013 | Fish | A61B 5/0002 |
| | | | | 705/3 |
| 8,750,471 | B2* | 6/2014 | Tew | H04M 3/38 |
| | | | | 379/93.09 |
| 8,831,204 | B1* | 9/2014 | Pycko | H04M 3/5166 |
| | | | | 379/265.02 |
| 9,307,084 | B1* | 4/2016 | Pycko | H04M 3/5166 |
| 2008/0048025 | A1* | 2/2008 | Fitzgerald | G06Q 20/10 |
| | | | | 235/380 |
| 2012/0089481 | A1* | 4/2012 | Iozzia | G06F 21/31 |
| | | | | 705/26.41 |
| 2012/0140911 | A1* | 6/2012 | Johansen | H04M 3/2281 |
| | | | | 379/93.02 |
| 2013/0129069 | A1* | 5/2013 | Peterson | H04M 3/5141 |
| | | | | 379/265.02 |
| 2016/0014278 | A1* | 1/2016 | Defoort | H04L 63/18 |
| | | | | 379/142.05 |
| 2016/0104145 | A1* | 4/2016 | Critchley | G06Q 20/325 |
| | | | | 705/41 |

* cited by examiner

SYSTEM AND METHOD FOR SECURE TRANSMISSION OF DATA SIGNALS

CROSS REFERENCE TO RELATED APPLICATIONS

This application claims priority to U.S. Application No. 62/196,159, filed on Jul. 23, 2015, which is incorporated by reference in its entirety. This application also claims priority to United Kingdom Application No. GB1513048.7, filed on Jul. 23, 2015, which is incorporated herein by reference in its entirety.

BACKGROUND

1. Field of the Art

The invention relates generally to a telephone call processing system and a method of processing telephone calls, and in particular to systems and methods that facilitate secure transmission of sensitive information during a call between a caller and an agent such that the agent does not receive the sensitive information.

2. Background

Call centers are typically large facilities of telephone operators or 'agents'. These centers are provided by organizations that want to interact with existing or prospective clients and customers. A call center agent normally interacts with a client or customer by taking or making telephone calls. It is common practice for the call centers to record client conversations, and for information taken during the call to be relayed to, entered into and stored in a server associated with the call center.

One use of call centers is to provide services to the public that allow payment for goods and services via telephone calls. Each year, millions of people make purchases through agents in telephone call centers, often including high value transactions. For example, family holidays and financial products are often purchased over the telephone. In these transactions, the caller is required by the agent to provide certain pieces of sensitive information in order to confirm his or her identity and/or to complete the purchase. In particular, the sensitive information can include one or more answers to security questions, a password, a date of birth, one or more bank account numbers, and debit or credit card details including the primary account number (PAN), start date, expiry date, and the card security code (e.g. CV2).

It is an unfortunate fact of life that wherever people have access to sensitive information, it will be misused. Data and card fraud perpetrated by call center agents, as well as fraudulent financial transactions are well-documented problems that need to be addressed. By divulging identity and/or financial information to an agent for processing a transaction through a call center, a caller puts themselves at risk of having that information stolen by the agent and used for nefarious purposes. Other threats exist from hackers gaining access to an agent's computer or a call center network, or eavesdroppers intercepting a call to an agent. Thus, data stored in call recordings, or sent by a caller to an agent may also be at risk from theft by third parties. In order for the industry to flourish, it is essential that clients and customers calling a call center are able to trust that their sensitive information is not at risk.

To address card fraud, the payment card industry established a number of data security standards. One example is the Payment Card Industry (PCI) Data Security Standard (DSS) which provides periodically updated guidelines for the processing and storage of credit card data. In particular, the PCI-DSS specifies the ways in which companies that handle credit card data (including telephone-based credit card transactions) are permitted to store information. All merchants, globally, are expected to comply with the PCI-DSS, and so these regulations have a direct impact on call centers that receive sensitive information during telephone calls.

Several known systems exist to allow call center agents to take debit or credit card payments over the phone without the caller having to read out sensitive card details (e.g. primary account number (PAN), start date, expiry date, the card security code (e.g. CV2)) to the agent directly. These systems typically require the caller to enter the card details using a 'touch-tone' keypad, which encodes the details using dual-tone multi-frequency (DTMF) signaling. DTMF has been established for decades and, as would be familiar to a skilled person, can be used to communicate some alphanumeric characters (i.e. the digits 0-9, *, #, and the characters A-D) through a telephone audio channel during a phone call. The DTMF tones used to encode the caller's card details can then be decoded by a call processor and transmitted to a payment processing system.

DTMF offers a basic level of security that represents a significant improvement over a caller speaking his or her card details to the agent. However, it is a long way from assuring customers that their sensitive information is not at risk. DTMF is easily decoded by conventional and readily available systems. Accordingly, a determined agent or third party would even be able to steal card details transmitted by DTMF, simply by obtaining or copying the signal that is recorded and stored by the call center and then by employing a DTMF decoder offline to reveal the digits. Thus, the use of DTMF alone was quickly found to be insufficient for establishing a robust data security system.

Various solutions have been adopted in the past, typically involving blocking DTMF tones from being passed to the agent or call recording apparatus. This typically involves one of two processes: DTMF clamping, in which the DTMF tones are removed from the speech path by means of a digital signal processor, or DTMF masking, in which other tones are played to the agent at the same time as the callers DTMF. Both processes claim as a benefit the fact that continuous speech interaction between the caller and the agent is possible during the process.

There are a number of problems with these approaches. Firstly, both suffer from a problem known as DTMF bleed through. This stems from the small delay required (20-40 ms) to register the fact that a DTMF tone is being played before the masking or clamping function can be invoked. The result is a series of very short bursts of DTMF passing towards the agent and the call recorder which, with sufficient care and equipment, can be used to reconstruct the card number being entered by the customer. Secondly, many customers tend to verbalise the individual digits of their card details while keying them into the phone. Thirdly, equipment must typically be installed in the contact center to perform either DTMF clamping or DTMF masking. Such a system requires regular security audits, due to the sensitive nature of the data that it processes. These audits greatly add to the cost of maintaining the solution, and the contact center itself is still burdened with the physical security of the equipment.

The present invention aims to overcome these disadvantages, without sacrificing usability, and preferably reducing operating costs at the same time.

SUMMARY

A first aspect of the invention provides a system for controlling signaling data transmitted over a communication system between a first party and a second party comprising a first communication channel configured to carry communication data, wherein the communication data comprises the content of the communication between the first party and the second party; a second communication channel configured to carry signaling data, wherein the signaling data comprises data relating to the first communication channel and sensitive data transmitted by the first party; a signaling processor configured to receive the signaling data from the first party via the second communication channel, modify the signaling data to remove or replace at least some of the sensitive data in the signaling data, and transmit the modified signaling data via the second communication channel to the second party.

Preferably, the signaling processor is further configured to analyze the signaling data to detect the sensitive data within the signaling data. Also preferably, the signaling processor is configured to modify the signaling data in response to the detected sensitive data.

The signaling processor may be configured to detect sensitive data by detecting a pattern within the signaling data. When the signaling processor is configured to detect a pattern within the signaling data, the signaling processor may also be configured to begin modifying the signaling data in response to the detected pattern.

The signaling processor may also be configured to analyze the signaling data to detect when the pattern is complete. The signaling processor may be further configured to stop modifying the signaling data in response to the detected pattern completion.

In order to detect a pattern within the signaling data, the signaling processor may be configured to determine the frequency with which signaling elements corresponding to sensitive data are detected in the signaling data. Alternatively, or additionally, the signaling processor may be configured to detect a pattern in the signaling data by comparing the signaling elements corresponding to sensitive data in the signaling data to one or more known patterns.

The signaling elements corresponding to sensitive data may be representations of in-band signaling elements, for example dual-tone multi-frequency (DTMF) tones.

The signaling processor may also be configured to transmit a mute signal to a control device in communication with the first party in response to the detected pattern, wherein the mute signal causes the control device to mute audio content of the communication data transmitted by the first party.

Additionally, or alternatively, to the signaling processor modifying the signaling data in response to a detected pattern, the signaling processor may be configured to modify the signaling data in response to a modification signal received by the signaling processor. The modification signal may be received from the second party or the modification signal may be received from the first party.

According to a second aspect of the invention, a method for controlling signaling data transmitted over a communication system between a first party and a second party is provided. The method comprises the steps of: receiving, at a signaling processor, signaling data via a second communication channel, the signaling data comprising data relating to a first communication channel and sensitive data transmitted by the first party; modifying the signaling data to remove or replace at least some of the sensitive data in the signaling data; transmitting the modified signaling data via the second communication channel to the second party; receiving, by a control device, the modified signal data transmitted from the signaling processor via the second communication channel; and receiving, by the control device, communication data via the first communication channel, the communication data comprising the content of the communication between the first party and the second party.

The method may further comprise the step of transmitting, by the control device, the modified signaling data and communication data to the second party.

Prior to the step of modifying the signaling data, the method preferably comprises the step of analyzing the signaling data to detect the sensitive data within the signaling data. The step of modifying the signaling data is preferably performed in response to the detected sensitive data.

The step of analyzing the signaling data may comprise detecting a pattern within the signaling data, in which case, the signaling processor may be configured to begin modifying the signaling data in response to the detected pattern.

The step of analyzing the signaling data may further comprise detecting when the pattern is complete, and the step of modifying the signaling data may end in response to the detected pattern completion.

The step of analyzing the signaling data may comprise determining the frequency with which signaling elements corresponding to sensitive data are detected in the signaling data. Additionally, or alternatively, the step of analyzing the signaling data may comprise detecting a pattern in the signaling data by comparing signaling elements corresponding to sensitive data in the signaling data to one or more known patterns.

The signaling elements corresponding to sensitive data may be representations of in-band signaling elements, for example DTMF tones.

The method may also further comprises the step of transmitting a mute signal from the signaling processor to a control device in communication with the first party in response to the detected pattern, wherein the mute signal causes the control device to mute audio content of the communication data transmitted by the first party.

Additionally, or alternatively, to analyzing the signaling data to detect sensitive data, the method may comprise receiving a modification signal at the signaling processor, wherein the step of modifying the signaling data is carried out in response to the modification signal. The modification signal may be received from the first party or the second party.

DETAILED DESCRIPTION

Figure 1:
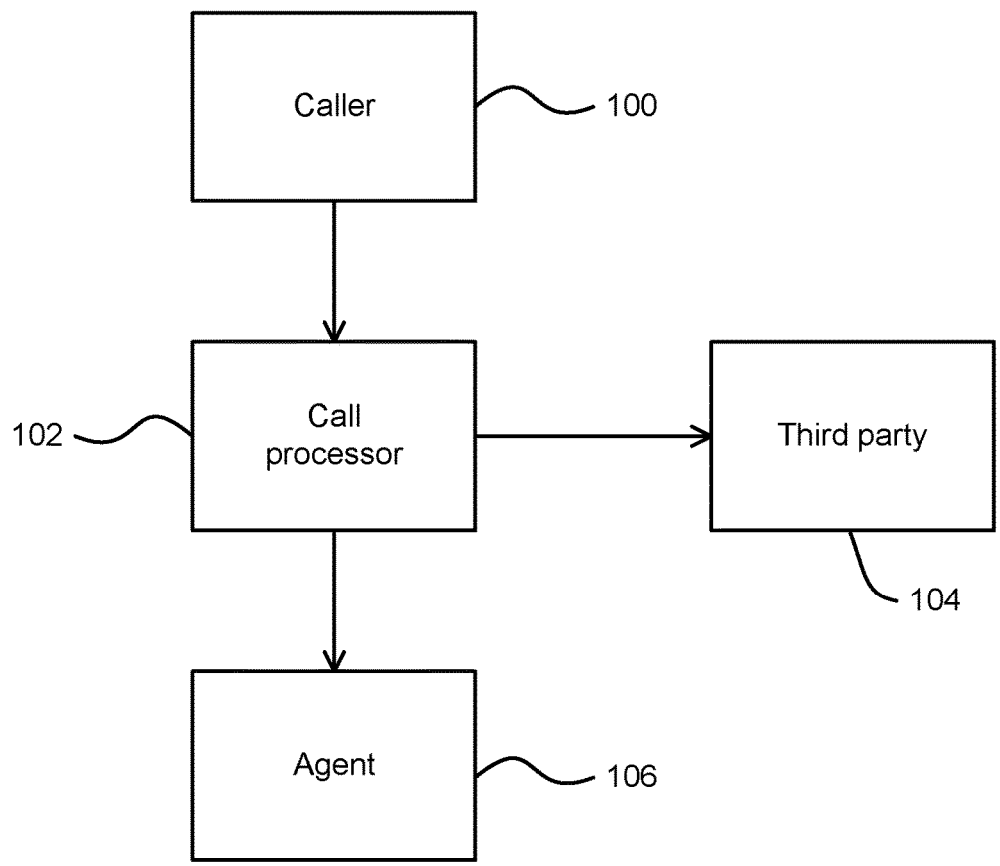
FIG. 1 illustrates a representation of a first exemplary call processing system of the prior art.

As mentioned above, existing call processing systems typically employ dual-tone multi-frequency (DTMF) clamping or DTMF masking in order to prevent card details entered by a caller using a touch-tone keypad from reaching the agent. An example of prior art system that employs DTMF clamping is depicted in FIG. 1. The card details are input by a caller 100 during a telephone call between the caller 100 and an agent 106. The telephone call is processed in a call processor 102 capable of DTMF clamping. The in-band DTMF tones representing the card details are extracted and transmitted to a third party 104 (e.g. a bank or credit card issuer). The DTMF tones are removed from the in-band signals and only voice signals are transmitted to the agent 106.

Figure 2:
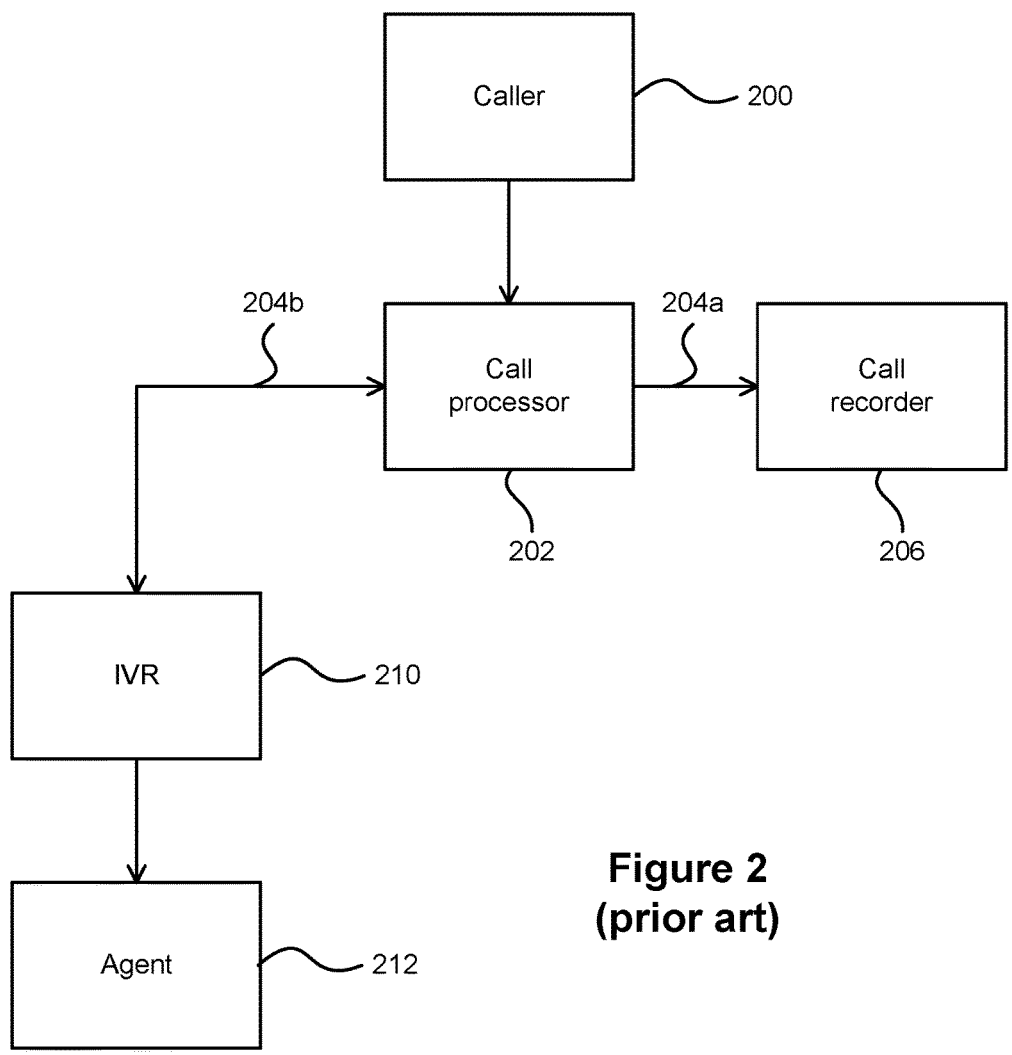
FIG. 2 illustrates a representation of a second exemplary call processing system of the prior art.

Systems such as the system depicted in FIG. 1 prevent all DTMF tones from being transmitted to the agent 106, hence it is not possible to employ an interactive voice response (IVR) systems 'downstream' of the call processor 102. To overcome this issue WO 2011/117573 discloses a solution that prevents theft of DTMF from recorded and stored signals whilst enabling use of an IVR system. A simplified representation of the solution is shown in FIG. 2. A call processor 202 operates by splitting the incoming signal from a caller 200 into first and second versions 204*a*, 204*b*. One of the versions 204*a* of the incoming signal is directed to a call recorder 206 and is to be recorded and stored by the call center. All DTMF tones are removed from version 204*a* of the signal using conventional sensing and filtering techniques. Thus, the recorded and stored signal in the call recorder 206 lacks any tones representing sensitive information, which cannot thus be stolen. Version 204*b* of the signal is sent to the agent 212 for processing as usual, and may be routed through an IVR 210. However, this system still suffers from the issues of DTMF bleed through on the signal directed towards the call recorder 206, discussed above, and cannot prevent any vocalisation of sensitive data from being recorded. Furthermore, this system still permits the agent 212 to hear the DTMF tones. Thus, a particularly determined agent 212 or third party may make his or her own recording of the DTMF tones for decoding offline. This has become more prevalent with the near ubiquity of digital recording devices such as smart phones, which would facilitate such a crime.

Figure 3:
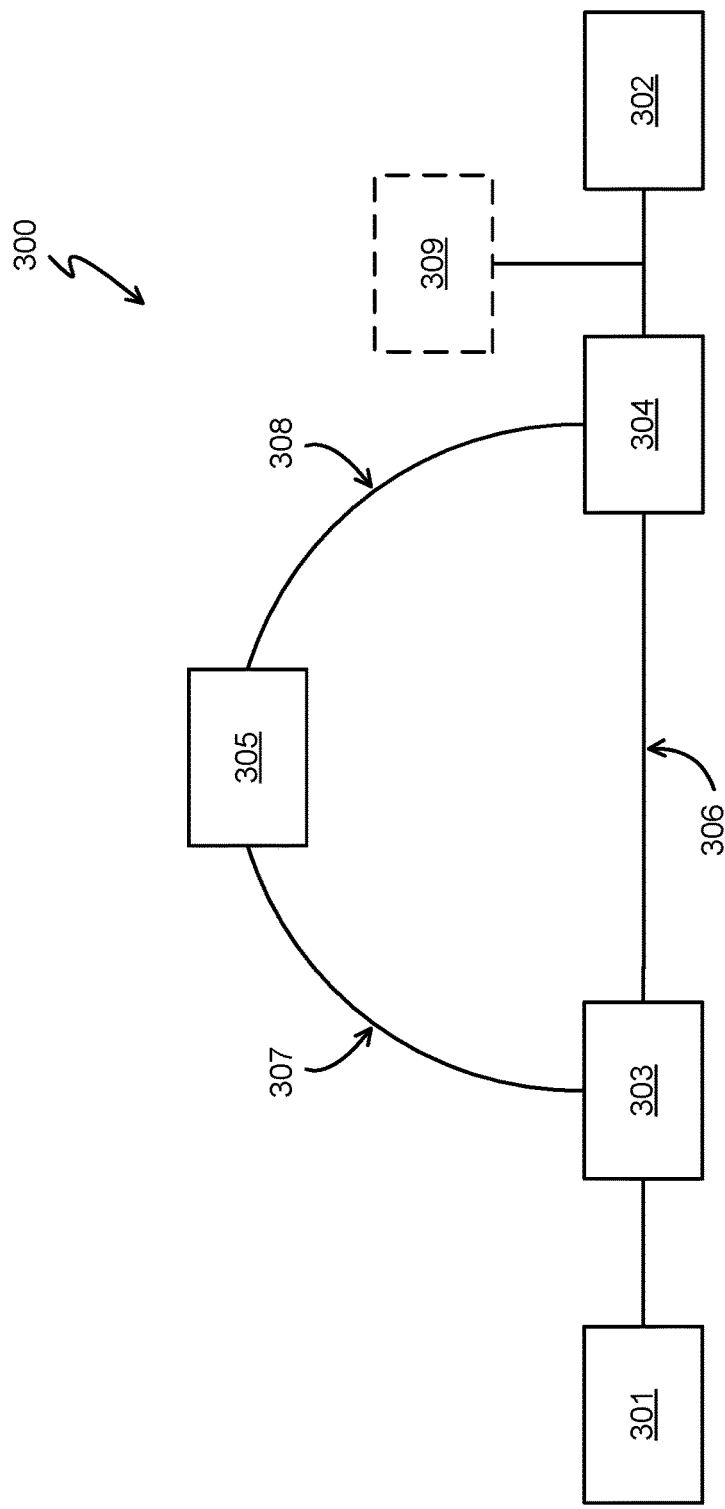
FIG. 3 illustrates a call processing system, according to one embodiment of the invention.

FIG. 3 depicts a communication system 300 that overcomes the intrinsic difficulties with handling sensitive information as well as the problems associated with existing systems described above. The system 300 facilitates communication between a first party 301 and a second party 302. The description of the system 300 is provided in the context of an IP-based network connecting the various components of the system 300; however, it will be appreciated that other forms of network protocol may be employed. The first and second parties 301, 302 communicate using electronic devices, for example a landline telephone, mobile telephone, Voice over IP (VoIP) telephone, computer or tablet device.

The system 300 comprises control devices 303 and 304, which are in communication with the first party 301 and second party 302, respectively. The control devices 303, 304 provide an interface between the communication system of the present invention and the first and second parties 301, 302. In an IP-based network, the control devices 303, 304 are typically session border controllers (SBCs): devices responsible for controlling the signaling and media streams involved in setting up, conducting, and tearing down telephone calls or other interactive media communications such as video calls.

The communication links between the control devices 303, 304 and the first and second parties 301, 302 may be direct or include other intermediate networks and systems. For example, the control devices 303, 304 may be connected to the first and second parties 301, 302 through a public switched telephone network (PSTN) or via an wide area IP network, or may be part of the same local area network as the communication device used by the first or second party 301, 302.

The control devices 303, 304 are in communication with one another via two channels: a first channel 306, and a second channel 307, 308. The second channel 307, 308 has an intermediate signaling processor 305 through which all data carried by the second channel passes. The system 300 may also comprise an optional processing device 309, which is depicted as being in communication with the second control device 304 and the second party 302; however, the processing device 309 can be located anywhere in the media path, i.e. anywhere in communication with the system 300.

The signaling processor 305 is capable of modifying or otherwise controlling the signals transmitted via the second channel 307, 308. In particular, the signaling processor 305 is capable of replacing, removing or otherwise obfuscating sensitive data that is transmitted between the first control device 303 and second control device 304 before it is transmitted to the second control device 304 and, ultimately, the second party 302. It will be appreciated that the description herein refers generally to information and data transfer from the first party 301 to the second party 302, but the symmetry of the system enables the same actions also to be carried out on data transmitted from the second party 302 to the first party 301.

The signaling processor 305 may also be capable of using the sensitive data that it receives to carry out further actions, such as transmitting the data to a payment service provider if the sensitive data include a credit/debit card number and CV2. The payment service provider may then transmit the data on as known in the art on facilitate the authorisation of a credit/debit card transaction, for example.

The signaling processor 305 may also analyze the data that is transmitted from the first party 301 via the second channel 307 to detect the sensitive data, and modify the sensitive data before it is transmitted via the second channel 308 to the second party 302 in response to detection of the sensitive data.

In one embodiment of the invention, the communication system 300 is used to facilitate a credit/debit card transaction that is carried out by telephone. Telephone calls are delivered to a call center (i.e. the second party) over an IP-based network using Session Initiation Protocol (SIP). Card data is input to a touch tone keypad of a telephone by the first party 301 and is encoded as DTMF tones. The DTMF tones may be transmitted from the first party to the telecommunications company (telco) via a signaling channel that is logically separate from the voice channel. In this case, the DTMF tones are represented in the signaling stream by metadata. It will be appreciated that the invention is described with respect to DTMF tones by way of example only. Other forms of in-band signaling data may be subject to some, or all, of the same shortcomings as DTMF discussed above; hence, systems employing alternative in-band signaling systems will also benefit from the improvements provided by the present invention. Furthermore, it will be appreciated that the system of the present invention does not require that the signaling data corresponding to the sensitive data is in-band with the media data, or that the signaling data corresponding to the sensitive data ever was in-band with the media data at any point during the transmission of data between the first and second parties 301, 302. Indeed, many of the improvements in security that are provided by the present invention are also application to communication systems that employ always out-of-band signaling.

Alternatively, if the telephone call is made using the PSTN rather than VoIP, the DTMF tones may be transmitted in band with the voice data and subsequently separated (e.g. by the telco) into distinct voice and signaling channels. During separation, the DTMF tones are moved (e.g. by the telco adopting an appropriate configuration setting) from the voice channel to the signaling channel. Separation may be before receipt of the voice and signaling channels by the first control device 303, which is, for example, a SBC. Alternatively, separation may be carried out in the first control device 303 itself The first control device 303 transmits the voice data directly to the second control device 304, for example using the Real-time Transmission Protocol (RTP), using the first communication channel 306, and transmits the signaling data to the signaling processor 305 using the second communication channel 307. The signaling processor 305 modifies the signaling data by removing the card data from the signaling data. For example, the signaling processor 305 may simply remove some or all of the card data from the signaling data. Alternatively, the signaling processor 305 may replace the sensitive data with placeholder or random data (e.g. replacing DTMF tones representing a card number in the signaling data with non-numeric DTMF tones).

Since the signaling data is transmitted via a different communication channel than the communication data, the signaling data can take a different physical route from the first control device 303 to the second control device 304. This enables the signaling processor 305 to be physically located anywhere that is connected to the appropriate network, which has several key advantages. It makes the system 300 easier to maintain: a single physical device can act as a signaling processor 305 for the signaling data for multiple communication sessions between the same and different control devices 303, 304. Additionally, multiple signaling processors 305 can be co-located, allowing for readily available scalability. It also makes the system 300 more resilient: SBCs are designed to provide failover routing, such that failure of the signaling processor 305 will not interrupt ongoing or new communication sessions; hence, by having multiple signaling processors 305, the system 300 can be made resilient to component failure.

As mentioned above, the signaling processor 305 may analyze the signaling data to detect the sensitive data within the signaling data. The signaling processor 305 may observe the frequency with which DTMF tones, or other elements of in-band signaling data, are received to determine whether sensitive data is being entered. For example, when a user is navigating a telephone menu using a telephone keypad, DTMF tones are received with a relatively low frequency since the user typically must wait to hear the various options before selecting one. In contrast, when a user enters a card number, or other sensitive information, the key presses, and hence the DTMF tones, are much more frequent.

Additionally, or alternatively, the signaling processor 305 may detect sensitive data by analyzing signaling data to search for predefined patterns, for example the first six digits of a 16-digit card number including a recognizing Issuer Identification Number (TIN).

The signaling processor 305 may modify the signaling data in response to the detected sensitive data. For example, when the signaling processor 305 detects sensitive data, such as a card number, within the signaling data, the signaling processor 305 may begin to modify (e.g. by removal or replacement as discussed above) the sensitive data.

The signaling processor 305 may further analyze the signaling data to detect when the pattern that indicates the presence of sensitive data ends. For example, if the pattern is a higher frequency of DTMF tones, or other in-band signaling elements, a significant reduction in the frequency or cessation in the input of DTMF tones, or other in-band signaling elements, may indicate that the sensitive data is no longer being input. As another example, if the pattern begins with a known sequence of digits which are identified as forming the beginning of a sixteen digit account number, then the end of sensitive data could be taken as the receipt of the sixteenth digit.

When the signaling processor 305 determines that the pattern indicating sensitive data has ended, the signaling processor 305 stops modifying the signaling data.

In response to the detected input of sensitive data, the signaling processor 305 may also transmit a signal to the first control device 303 to cause the first control device 303 to mute any audio during the input of the sensitive data, to prevent the vocalisation of input digits being transmitted and recorded. As will be known to the skilled person, the form of mute signal utilised is dependent upon the application layer of the communications protocol being employed, and in some cases the control device itself As an example, a user (e.g. the first party 301) may input a 16-digit credit card number which consists of a 6 digit IIN, a 9-digit individual account identifier and a single-digit checksum number. When the signaling processor 305 determines that a card number is being input (e.g. by an increased frequency of DTMF tones) the signaling processor 305 may replace or remove the middle 6 digits of the individual account identifier from the signaling data, preventing its transmission to the second party 302. Since the IIN is transmitted, the second party 302 is still capable of determining the type of card that was used and since the first 6 and final 4 digits are transmitted, the second party 302 can use these digits as a pseudo-unique identifier for the card, as is standard practice in the art.

Alternatively or additionally to automatically detecting sensitive information within the signaling data, the signaling processor 305 may modify the signaling data in response to an external signal received by the signaling processor 305, for example a signal transmitted by a call center worker to indicate that sensitive information is about to be input.

Once the signaling data has been modified, the signaling processor 305 transmits the modified signaling data (i.e. the signalling data without the card data) to the second control device 304.

Under normal circumstances (i.e. when the signaling processor 305 does not detect sensitive data within the signaling data and when the signaling processor 305 has not received a signal indicating that the signaling data should be modified) the signaling processor 305 simply passes the signaling data transparently.

This approach is further extensible to other communications media, for example Web Real-Time Communication (WebRTC). The signaling for WebRTC is not explicitly defined by the standard, but is left to the application developer; hence, by arranging for the card data to be keyed by the customer into a web application, which also drives the signaling used to control the voice data transmitted between the first party 301 and second party 302 (and optionally other media data such as text or video), the card data can be held separate from the voice data entering the contact center by transmitting it via the second channel 307, 308.

Typically, the first party 301 interacts with a web application which, in turn, starts a WebRTC session. The web application could be as simple as a click to call button displayed on a web page, or could be part of a web chat application, with the option to upgrade to a speech or video call with the second party 302. In all cases, the second channel 307, 308 is established between the first control device 303 and the signaling server 305, and the second control device 304 and the signaling server 305. In a WebRTC-based system, the control devices 303, 304 are not SBCs, as in the VoIP-based system, but are typically web browsers or similar user agents (in which the web application runs or is displayed) running on electronic devices (e.g. personal computers, laptops, tablets or smartphones).

Once the second channel 307, 308 is established, the signaling processor 305 controls the set-up (and, later, the tear-down) of the first channel 306, which carries the media data (e.g. voice or video data) between the first control device 303 and second control device 304. The first channel 306 may be a peer-to-peer connection between the first control device 303 and second control device 304. The system 300 may further comprise the optional processing device 309, which may be utilised as an intermediate media proxy/call recording system which records the media data that is received and transmitted between the first and second parties 301, 302.

Since the web application running on the first control device 303 remains in communication with the signaling server 305 at all times, it is possible to initiate a message from the second party 302 that will command the first party's 301 web browser, running on the first control device 303, to display a secure input form into which credit/debit card data, or other sensitive data, is input by the first party 301. The sensitive data that is input to the secure form can then be transmitted to the signaling processor 305 via the second channel 307, 308, and subsequently to the second party 302. As discussed above, the signaling processor 305 is configured to analyze the data transmitted via the second channel 307, 308 to detect sensitive data and to modify the sensitive data before transmitting the sensitive data to the second party 302. Alternatively, the modified sensitive data input to the secure form and modified by the signaling processor 305 may be transmitted to another server or service provider may be transmitted to another server or service provider via a third communication channel, distinct from the first communication channel 306 and second communication channel 307, 308, instead of or as well as being transmitted to the second party 302. As a result, when the input of sensitive data is required by the second party 302 (e.g. when a credit/debit card payment needs to be made) the sensitive data is not transmitted as part of the media data carried in the first channel 306, so is not recorded by the media proxy/call recording system, and is not transmitted in full to the second party 302, further improving the security of the sensitive data.

Other security features of the VoIP system described above may be applied to this system. For example, to prevent inadvertent vocalisation of sensitive data as it is input, the second party 302 may instruct the media proxy/call recording system to cease recording the media data temporarily, until the secure data process has ended, or may cause any audio transmitted from the first control device 303 to be muted.

The present invention has been described with reference to particular embodiments; particularly in the context of receiving credit/debit card information using DTMF tones. However, the invention is not limited to those embodiments or to DTMF tones and finds utility in other contexts and with other forms of in-band and out-of-band signaling. The present invention is defined by the appended claims.

What is claimed is:

1. A system for concurrently transmitting communication data and signaling data over a communication system from a first party to a second party comprising:
   a communication channel configured to carry the communication data, wherein the communication data comprises content of the communication between the first party and the second party;
   a signaling channel configured to carry the signaling data, wherein the signaling data comprises data relating to the communication channel and sensitive data transmitted by the first party; and
   a signaling processor configured to receive the signaling data from the first party via the signaling channel, modify the signaling data to remove or replace at least some of the sensitive data in the signaling data, and transmit the modified signaling data via the signaling channel to the second party.

2. The system of claim 1, wherein the signaling processor is further configured to analyze the signaling data to detect the sensitive data within the signaling data.

3. The system of claim 2, wherein the signaling processor is configured to modify the signaling data in response to the detected sensitive data.

4. The system of claim 3, wherein the signaling processor is configured to detect sensitive data by detecting a pattern within the signaling data.

5. The system of claim 4, wherein the signaling processor is configured to begin modifying the signaling data in response to the detected pattern.

6. The system of claim 5, wherein the signaling processor is configured to analyze the signaling data to detect when the pattern is complete.

7. The system of claim 6, wherein the signaling processor is configured to stop modifying the signaling data in response to the detected pattern completion.

8. The system of claim 4, wherein the signaling processor is configured to detect a pattern in the signaling data by determining the frequency with which signaling elements corresponding to the detected sensitive data are detected in the signaling data.

9. The system of claim 4, wherein the signaling processor is configured to detect a pattern in the signaling data by comparing the signaling elements corresponding to the detected sensitive data in the signaling data to one or more known patterns.

10. The system of claim 4, wherein the signaling processor is configured to transmit a mute signal to a control device in communication with the first party in response to the detected pattern, wherein the mute signal causes the control device to mute audio content of the communication data transmitted by the first party.

11. The system of claim 3, wherein the signaling processor is configured to modify the signaling data in response to a modification signal received by the signaling processor.

12. The system of claim 11, wherein the modification signal is received from the second party.

13. The system of claim 11, wherein the modification signal is received from the first party.

14. The system of claim 1, wherein the signaling elements corresponding to sensitive data are representations of in-band signaling elements.

15. The system of claim 14, wherein the representations of in-band signaling elements are representations of DTMF tones.

16. A method for concurrently transmitting communication data and signaling data over a communication system from a first party to a second party, the method comprising the steps:
   receiving, at a signaling processor, the signaling data via a signaling channel, the signaling data comprising data relating to a communication channel and sensitive data transmitted by the first party;

modifying the signaling data to remove or replace at least some of the sensitive data in the signaling data;

transmitting the modified signaling data via the signaling channel to the second party;

receiving, by a control device, the modified signal data transmitted from the signaling processor via the signaling channel; and receiving, by the control device, communication data via the communication channel, the communication data comprising the content of the communication between the first party and the second party.

17. The method of claim 16, further comprising the step of:

transmitting, by the control device, the modified signaling data and communication data to the second party.

18. The method of claim 16, further comprising, prior to modifying the signaling data, the step of:

analyzing the signaling data to detect the sensitive data within the signaling data.

19. The method of claim 18, wherein the step of modifying the signaling data is performed in response to detected sensitive data.

20. The method of claim 19, wherein the method further comprises the step of:

transmitting a mute signal from the signaling processor to a control device in communication with the first party in response to the detected sensitive data, wherein the mute signal causes the control device to mute audio content of the communication data transmitted by the first party.

* * * * *